Patented Aug. 15, 1944

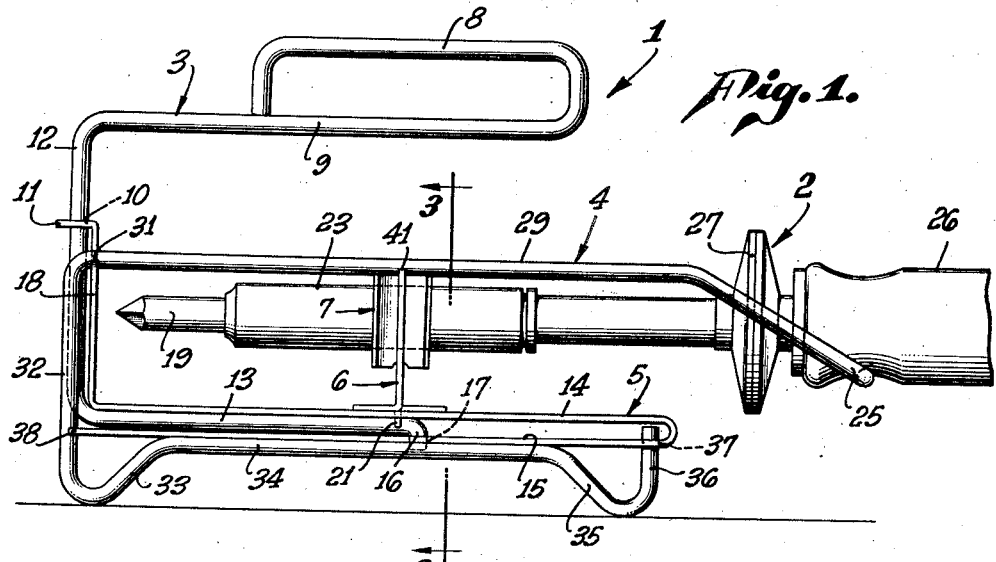

2,355,883

UNITED STATES PATENT OFFICE 2,355,883

SOLDERING IRON REST

Edwin S. Mathews, Burbank, Calif.

Application June 2, 1943, Serial No. 489,393

16 Claims. (Cl. 113—111)

The invention relates to an improved rest or stand for soldering irons.

There are two general types of soldering iron stands or rests in common use, the open type and the closed type. The open type is a trough-like bed usually supported by rod legs, and the closed type is a pipe or tube usually surrounded by a perforated or wire mesh guard and supported by metal legs. When the open type stand is in use, the stand, as well as the soldering iron, must be kept heated at a working temperature in order to do good soldering, but this condition generally cannot be maintained because while the iron is being used, the stand cools off quickly due to the natural radiation of the stand. When the iron is returned to the stand of a lower temperature, the temperature of the iron is also lowered due to the heat being conducted from the iron to the stand by the large surface contact between the iron and stand, therefore the soldering iron must remain in the stand until both the stand and iron have reached the working temperature. This delay is usually overcome by resting the tip on the edge or small surface of the stand and the handle on the table or bench, thus reducing the heat conducting area between iron and stand, allowing the iron to reach the working temperature more quickly.

The same condition exists with the closed type of the stand except that when the iron is allowed to remain for long intervals in the closed part of the pipe or tube, the air surrounding the iron becomes superheated as there is only a small circulation of air to carry off the excess heat within the closed area of the stand. Hence the iron soon becomes overheated. This not only shortens the life of the iron, but also the soldering flux volatilizes, due to the high temperature of the iron causing an oxidizing condition, making the work difficult to solder. This condition is usually overcome by using the same method as explained above.

An object of the invention is to overcome the above defects and generally to improve the construction of a soldering iron rest or stand, to the end that the soldering iron while properly supported may freely radiate excess heat into the open air so that the iron will maintain a proper working temperature. Hence the iron is not overheated or unduly cooled due to its contact with or enclosure within the stand as heretofore.

Another object of the invention is to provide a simple means for adjusting the effective length of the rest or support, in order to accommodate soldering irons of different length.

Another object of the invention is to provide a guard which will not interfere with the ready insertion and removal of the soldering iron and which will prevent the operator or the materials operated upon from accidentally contacting the heated tip when on the rest.

Another object of the invention is to provide an improved rest which may be made of metal rod and metal plate with the parts being so fashioned that they are mutually interlocking.

For further details of the invention, reference may be made to the drawing wherein Fig. 1 is a view in side elevation of an improved rest according to the present invention.

Fig. 2 is a plan view of the rest of Fig. 1.

Fig. 3 is a vertical sectional view on line 3—3 looking in the direction of the arrows.

Fig. 4 is a vertical sectional view of the tip rest and fin therefor, separated therefrom.

Referring in detail to the drawing, the soldering iron rest 1 in Fig. 1 is illustrated with a conventional soldering iron 2 in position on the rest. The rest 1 as here illustrated, is composed of five pieces of metal, namely the rod 3, the rod 4, the plate 5, plate 6 and fin 7.

The rod 3 is bent to provide a handle 8 by means of which the rest 1 may be carried. The rod 3 has a horizontal portion 9 which overlies the center of the rest and it continues through aperture 10 in lug 11 as a vertical portion 12 which continues as a horizontal portion 13 which extends between and separates the horizontal portions 14, 15 of the plate 5. The portion 13 terminates in a downwardly extending portion 16 which extends into and locks with an aperture 17 in the bottom plate member 15.

The plate 5 is bent to provide the two horizontal plate portions 14, 15 which as above stated, are separated by the rod portion 13 in order to provide an air space for cooling purposes. The plate portion 14 has at its left end an upwardly extending portion 18 from which the lug 11 is bent. The plate portion 18 serves as an end plate for the tip 19 of the soldering iron 2.

The plate portions 14, 15 serve as a base for supporting the tip support 6, 7. Plate portion 14 is provided with a plurality of sets of spaced apertures 20, each set accommodating the lugs 21 on the bottom of the plate 6 which is provided with a V notch 24 in which fits the V-shaped fin member 22 formed by laterally bending the sides of the plate member 7. The fin member 22 serves as a support for the heating element 23 of the soldering iron 2. Also the fin member 22 serves to radiate heat conducted from the heating element 23 to reduce its conduction through the tip-supporting plate 6 to the plate member 14.

The rod 4 comprises in part a substantially U-shaped portion of which the bight 25 is inclined downwardly to form a support for the handle 26 of the soldering iron 2. As shown, this bight 25 is wide enough preferably to accommodate the baffle plate 27 which forms a part of certain irons. The sides of the U extend as parallel members 28, 29 and they are also parallel to the rod portion 9. The rod portions 28, 29 extend above the plate 5 and parallel to it. The rod portions 28, 29 are spaced far enough apart to permit the iron 2 to pass between them and also the rod portion 9 is far enough above the rod members 28, 29 to permit lateral insertion and removal of the iron 2. The rod portions 9, 28 and 29 serve as guard rails to prevent wiring, which may be accidentally dropped across the top of the iron, from contacting the hot tip 19. When the iron 2 is supported by the tip support 6, 7 and by the bight 25, the hot tip 19 is below the level of the guard rails 28, 29.

The guard rails or rod portions 28, 29 at their left ends fit in U-shaped notches 30 and 31, respectively, in the vertical plate portion 16 in order to hold the latter. The rod portions 28, 29 at the left of the notches 30, 31 are bent vertically downwardly and both are the same construction, as will now be described in connection with rod 29, wherein the vertical portion 32 is bent to form a leg 33 which continues as a horizontal portion 34 on which the plate 15 rests. The horizontal portion 34 at the opposite end of the rest is bent to provide a leg 35 and it terminates in a vertically extending portion 36 which fits in an aperture 37 in the plate member 15. The left end of plate member 15, as shown in Fig. 2, has a notch 38 in which the vertical rod portion 32 fits, and a similar notch 39 in which the vertical rod portion 32' fits.

Hence, it will be apparent that the plate portions 14, 15 cannot move horizontally because plate member 15 abuts against the vertical rod portions 32 and 32', the plate portion 16 abuts against the vertical rod portions 32 and 32', the lug 11 holds the rod portion 12 which cannot move because the bent portion 16 interlocks with the aperture 17 and because the right end of plate 15 interlocks with the vertical rod portion 36 and with a similar one behind it. Also, the plate members 14, 15 cannot move downwardly because plate 15 rests on the horizontal rod portion 34 and on the similar rod portion 34'. Also, plate members 14, 15 cannot move upwardly without overcoming the spring tension in the U-shaped members 28, 29, 25 which holds the fin member 22 in the notch 24.

The guard rails 28, 29 rest in notches 40, 41, respectively, at the top of the V plate 5 and extend across the top of the fin member 22 to hold it in notch 24 as shown in Fig. 3. If it is desired to change the distance between the tip support 6, 7 and the handle support 25, the handle support 25 is pulled upwardly away from plate member 14 against the tension inherent in this unitary rod member to lift it off from the notches 40, 41, so that the lugs 21 may be fitted in another pair of the plate apertures 20 whereupon the handle portion 25 is released and it rests again, under its spring tension, in the notches 40, 41 as shown in Fig. 3.

As the guard rails 28, 29 hold the tip support 6 down on the plate member 14 to hold the rod portion 16 in notch 17, the guard rails 28, 29 comprise means for holding the guard rail 9 in position.

The rods 3 and 4 and the plate 5 provide in effect, an open framework for supporting the iron 2 so that while it is guarded when on the rest, it is substantially freely exposed to the atmosphere to permit the natural radiation of excess heat from the iron.

I claim:

1. A soldering iron rest comprising a supporting member, a tip support adjustable along said member, resilient spaced guard rails above said supporting member and supported on said tip support for retaining said tip support in adjusted position, said guard rails having an inclined extension forming a handle support.

2. A soldering iron rest comprising a base, a substantially U shaped rod, the branches of which extend lengthwise of said base and spaced apart substantially the width of said base, means supporting said branches above said base, means on said base for supporting the tip of said iron below said branches, the bight of said U rod being inclined downwardly and forming a support for the handle of said iron.

3. In a soldering iron rest, a base comprising a substantially U shaped flat metal plate, means supporting the branches of said U plate apart to form an air space, means supporting one of said branches above the other, a tip support, means supporting said tip support on the uppermost one of said branches, and a cooperating handle support.

4. In a soldering iron rest, a base comprising a pair of horizontal parallel flat plate members, a handle rod supporting said members apart, a tip support on the upper one of said members, legs on the lower one of said members, and a cooperating handle support.

5. A soldering iron rest comprising a base, three guard rails therefor extending substantially parallel to and lengthwise of said base, each two of said guard rails being spaced apart far enough to pass the tip end of said iron, and spaced supports below the lowermost two of said guard rails for supporting said iron.

6. A soldering iron support comprising a plate having two spaced substantially parallel portions forming a base, one of said portions having an upright extension forming an end piece, means for supporting said parallel portions one above the other, and means above said plate for supporting said iron with the tip thereof facing said upright extension.

7. A soldering iron support comprising a base, an upright plate on said base, said plate having a notch to receive the tip end of a soldering iron, means for adjusting the position of said plate on said base, and laterally spaced guard rails above said base, said plate comprising a support for said rails.

8. A base having a plurality of sets of apertures along its length, a tip support fitting each set of said apertures, and a pair of resilient guard rails above said base, said guard rails comprising spring means for holding said tip support in its adjusted position.

9. A soldering iron rest comprising a unitary rod having two upper and two lower longitudinally extending portions, said lower portions each having spaced projecting portions forming legs, a base supported by said lower portions of said rod, an intermediate portion of said rod being curved and connecting two of said portions and forming a handle support, and a tip support engaging the upper portions of said rods and said base for supporting the tip of the iron below said upper rod portions.

10. A soldering iron rest comprising a unitary rod having spaced substantially parallel portions forming guard rails and an intermediate inclined portion forming a handle support, a base, means supporting said guard rails laterally apart above said base, and a tip support below said rails on said base.

11. A rest according to claim 10 comprising an extension of said rod on each of said parallel portions, each of said extensions having spaced projecting portions forming legs.

12. In a soldering iron rest, a base, a tip support on said base, said tip support having a notch, a heat conducting fin member having an opening to receive the heating element of the iron, said fin member fitting said notch, and spring means for holding said fin member in said notch and holding said tip support on said base.

13. A soldering iron rest comprising a base, a tip support on said base, and a metal framework interlocked with said base, said framework comprising legs supporting said base, guard rails above said base, and a handle support.

14. A soldering iron rest according to claim 13 comprising means on said base for supporting said tip support in a plurality of positions, said framework also comprising means for holding said tip support in adjusted position on said base.

15. A soldering iron rest comprising a base, a tip support adjustable along said base, a resilient handle member forming a rest for the handle of the iron, means for securing said handle member to said base, said handle member having laterally spaced branches forming guard rails above said base, said branches resting on said tip support and resiliently retaining said tip support in adjusted position.

16. A soldering iron rest comprising a base, two laterally spaced guard rails extending substantially parallel to and lengthwise of said base, a handle member extending centrally above and substantially parallel to said guards, each two of said rails and said handle member being spaced far enough apart to pass the tip end of said iron, and spaced supports below said rails for supporting said iron.

EDWIN S. MATHEWS.